United States Patent
Jeong et al.

(10) Patent No.: US 8,891,662 B2
(45) Date of Patent: Nov. 18, 2014

(54) REFERENCE SYMBOL STRUCTURE FOR DFT SPREAD OFDM SYSTEM

(75) Inventors: Byung Jang Jeong, Daejeon (KR); Bangwon Seo, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/377,720

(22) PCT Filed: Jun. 14, 2010

(86) PCT No.: PCT/KR2010/003814
§ 371 (c)(1),
(2), (4) Date: Dec. 12, 2011

(87) PCT Pub. No.: WO2010/143926
PCT Pub. Date: Dec. 16, 2010

(65) Prior Publication Data
US 2012/0087393 A1    Apr. 12, 2012

(30) Foreign Application Priority Data

Jun. 12, 2009 (KR) .......................... 10-2009-0052208

(51) Int. Cl.
*H04L 27/10* (2006.01)
*H04L 5/00* (2006.01)
*H04L 27/26* (2006.01)

(52) U.S. Cl.
CPC ........... *H04L 5/0051* (2013.01); *H04L 27/2614* (2013.01); *H04L 27/2636* (2013.01)
USPC ........... 375/284; 375/232; 375/260; 375/285; 375/296; 375/349

(58) Field of Classification Search
CPC ... H04L 5/0048; H04L 5/0053; H04L 5/0007; H04L 27/2613; H04L 5/0023
USPC ......... 375/259–261, 271, 279–281, 284–285, 375/295–302, 308, 316, 320, 322, 324–350
See application file for complete search history.

(56) References Cited

U.S. PATENT DOCUMENTS

| | | | |
|---|---|---|---|
| 6,344,749 B1 * | 2/2002 | Williams | 324/620 |
| 2004/0076119 A1 * | 4/2004 | Aronson et al. | 370/249 |

(Continued)

FOREIGN PATENT DOCUMENTS

| | | |
|---|---|---|
| KR | 1020070119958 | 12/2007 |
| KR | 10-0862724 | 10/2008 |

(Continued)

OTHER PUBLICATIONS

International Search Report and Written Opinion for Application No. PCT/KR2010/003814, dated Feb. 1, 2011.

*Primary Examiner* — Sam K Ahn
*Assistant Examiner* — James M Perez
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a data transmission apparatus to transmit a reference orthogonal frequency division multiplexing (OFDM) symbol generated by frequency division multiplexing a reference symbol and a data symbol, and a data reception apparatus to estimate a channel using the reference OFDM symbol. Since the reference symbol and the data symbol are frequency division multiplexed, a Peak to Average Power Ratio (PAPR) may not increase greatly, and the transmission apparatus may transmit the reference OFDM symbol to the data reception apparatus more frequently. Accordingly, the data reception apparatus may estimate a channel accurately.

11 Claims, 6 Drawing Sheets

(56) References Cited

U.S. PATENT DOCUMENTS

| | | | |
|---|---|---|---|
| 2007/0008217 A1* | 1/2007 | Yang et al. | 342/357.12 |
| 2007/0058595 A1* | 3/2007 | Classon et al. | 370/337 |
| 2007/0280365 A1* | 12/2007 | Seki | 375/260 |
| 2009/0161749 A1* | 6/2009 | Nangia et al. | 375/233 |
| 2010/0124300 A1* | 5/2010 | Rajagopal | 375/340 |
| 2010/0279628 A1* | 11/2010 | Love et al. | 455/70 |
| 2011/0064041 A1* | 3/2011 | Hooli et al. | 370/329 |
| 2013/0315051 A1* | 11/2013 | Malladi et al. | 370/210 |

FOREIGN PATENT DOCUMENTS

| | | |
|---|---|---|
| KR | 1020080092801 | 10/2008 |
| WO | 2010/143926 | 12/2010 |

\* cited by examiner

REFERENCE SYMBOL STRUCTURE FOR DFT SPREAD OFDM SYSTEM

RELATED APPLICATIONS

This application is a 35 U.S.C. §371 filing of International Application No. PCT/KR2010/003814 which was filed on Jun. 14, 2010, and which claims priority to, and the benefit of, Korean Application No. 10-2009-0052208, filed on Jun. 12, 2009. The contents of the aforementioned applications are hereby incorporated herein by reference.

TECHNICAL FIELD

The present invention relates to mobile communications, and more particularly, to a technique of transmitting a reference symbol for a channel estimation in an orthogonal frequency division multiplex (OFDM) communication system.

BACKGROUND ART

Digital Fourier transform spread orthogonal frequency division multiplexing to (DFT spread OFDM) method has a low Cubic Metric (CM) and equivalently low Peak to Average Power Ratio (PAPR). Therefore, a power amplifier may be used efficiently. With the merit, DFT spread OFDM method has been adopted as an uplink transmission method of 3rd Generation Partnership Project (3GPP) long term evolution (LTE) system, and it is considered that it will be adopted as an uplink transmission method of 3GPP LTE-Advanced. DFT spread OFDM is also referred to Single Carrier Frequency Division Multiple Access (SC-FDMA) equivalently.

A reference symbol or a pilot signal is transmitted from a data transmission apparatus to a data reception apparatus for a channel estimation, and the like, in the data reception apparatus. In 3GPP LTE, a reference symbol is transmitted using a single OFDM symbol for every slot. This is for preventing the CM and PAPR from increasing when data and a reference symbol are mixed in a single DFT spread OFDM symbol, hereinafter referred to as OFDM symbol, due to a characteristic of the DFT spread OFDM system.

In LTE-Advanced, fundamental communication services need to be provided in a higher frequency spectrum and at a higher mobile velocity than those of LTE. However, a reference symbol structure based on an LTE system has difficulty in satisfying this. In LTE-Advanced, an environment with higher Doppler spread is formed when compared to an environment based on the LTE system. Therefore, it is difficult to expect a satisfactory performance with the reference symbol structure in the LTE system.

To solve the aforementioned problem, the frequency of reference symbols per slot may be increased in a time axis. To increase reference symbols in the time axis, the number of OFDM symbols which transmit reference symbols per slot may be increased. However, while an improvement in a performance of the channel estimation is ensured, an overhead increase due to the reference symbols may lead to a decrease in a data transmission rate.

As another scheme for solving the aforementioned problem, a reference symbol and data may be multiplexed in a single OFDM symbol, and transmitted. Then, the proportion of the reference symbols in a single OFDM symbol may be decreased. Accordingly, while the overhead due to the reference symbols per slot remains constant, a temporal frequency of reference signals per slot may be increased. To multiplex data and a reference symbol in a single OFDM symbol, methods of time division multiplexing (TDM), frequency division multiplexing (FDM), code division multiplexing (CDM), and the like may be considered. As a TDM method, a method of multiplexing data and a reference symbol in a time domain prior to a DFT in a sequence of generating a DFT spread OFDM signal may be considered. In this case, an overhead due to a cyclic prefix may increase, interference between data and a reference symbol in a data reception apparatus may increase, and the channel estimation may be complex.

In a CDM method, an increase in the cyclic prefix, interference between data and a reference symbol, and the like may occur at the same time.

The present invention discloses a multiplexing structure of data and a reference symbol having an interleaved FDM (IFDM) structure in which data and a reference symbol are mixed by an FDM.

DISCLOSURE OF INVENTION

Technical Goals

An aspect of the present invention is to temporally frequently transmit a reference symbol without increasing an overhead.

An aspect of the present invention is to multiplex a data symbol and a reference symbol in the same OFDM symbol while minimizing an increase in a PAPR.

Technical Solutions

According to an aspect of the present invention, there is provided a data transmission apparatus including a discrete Fourier transform (DFT) precoder to perform a DFT with respect to a data symbol, and a multiplexer to generate a reference orthogonal frequency division multiplexing (OFDM) symbol by performing a frequency division multiplexing (FDM) with respect to the discrete Fourier transformed data symbol and a reference symbol.

According to another aspect of the present invention, there is provided a data reception apparatus including a receiver to receive, from a data transmission apparatus, an OFDM symbol in which a data symbol and a reference symbol are frequency division multiplexed, a reference symbol extractor to extract the reference symbol from the OFDM symbol, a channel estimator to estimate a channel from the data transmission apparatus using the reference symbol, and an equalizer to equalize the data symbol using the estimated channel.

According to an aspect of the present invention, a reference symbol may be transmitted temporally and frequently without increasing an overhead.

According to an aspect of the present invention, a data symbol and a reference symbol may be multiplexed in the same OFDM symbol while minimizing an increase in a PAPR.

BEST MODE FOR CARRYING OUT THE INVENTION

Figure 1:
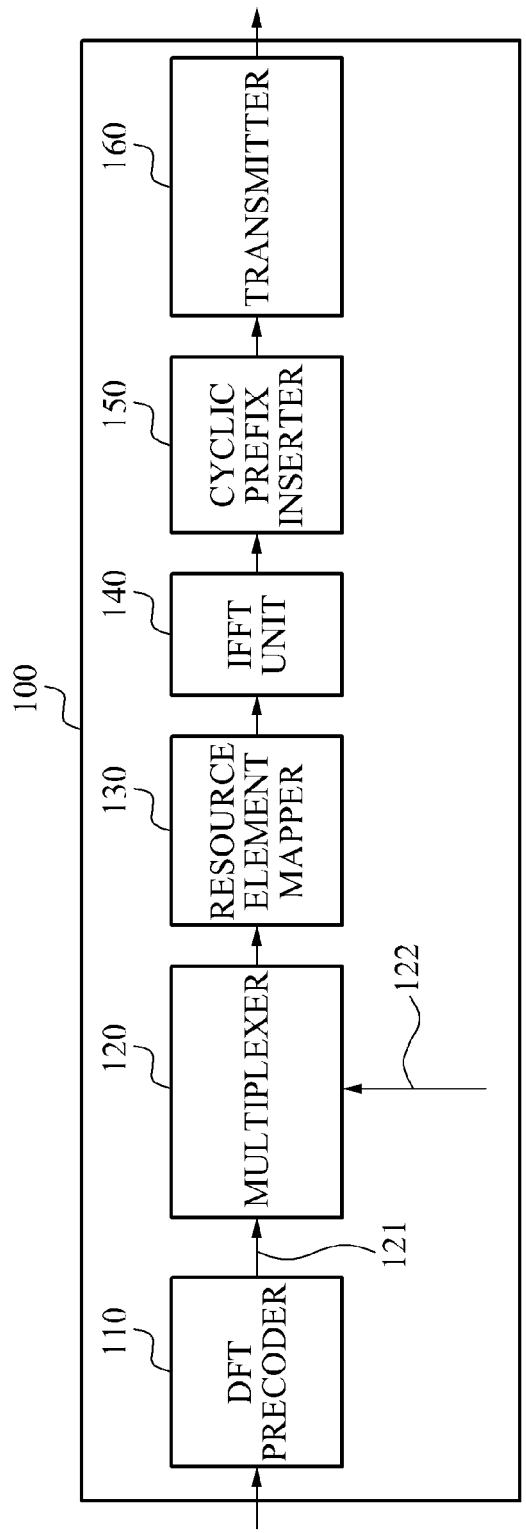
FIG. 1 is a diagram illustrating a structure of a data transmission apparatus according to an aspect of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a structure of a data transmission apparatus according to an aspect of the present invention. The data transmission apparatus 100 includes a discrete Fourier transform (DFT) precoder 110, a multiplexer 120, a resource element mapper 130, an inverse fast Fourier transform (IFFT) unit 140, a cyclic prefix inserter 150, and a transmitter 160.

The DFT precoder 110 may perform a DFT with respect to a data symbol. According to an aspect, the data symbol that the DFT precoder 110 receives may be a complex data symbol caused to be channel coded, interleaved, scrambled, and modulated by a modulation technique such as binary phase-shift keying (BPSK), quadrature phase-shift keying (QPSK), quadrature amplitude modulation (QAM), and the like. Hereinafter, a detailed operation of the DFT precoder 110 is described with reference to FIG. 2.

Figure 2:
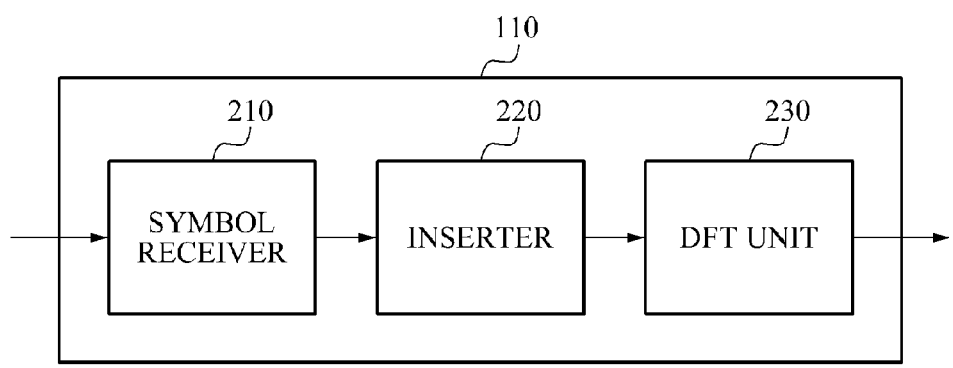
FIG. 2 is a diagram illustrating a structure of a discrete Fourier transform (DFT) precoder according to an aspect of the present invention.

FIG. 2 is a diagram illustrating a structure of the DFT precoder 110 according to an aspect of the present invention. According to an aspect, the DFT precoder 110 may include a symbol receiver 210, an inserter 220, and a DFT unit 230.

The symbol receiver 210 may receive a predetermined number of data symbols.

The number of data symbols that the symbol receiver 210 receives may vary depending on a type of an orthogonal frequency division multiplex (OFDM) symbol. For example, when the DFT precoder 110 performs a DFT with respect to the data symbols included in a data OFDM symbol, the symbol receiver 210 may receive M data symbols. In this case, the DFT unit 230 may perform an M-point DFT with respect to the M data symbols.

When the DFT precoder 110 performs the DFT with respect to the data symbols included in a reference OFDM symbol, the symbol receiver 210 may receive M/2 data symbols.

The discrete Fourier transformed data symbols may be inserted into the data OFDM symbol or the reference OFDM symbol. The data OFDM symbol may be a symbol including data and control channel information, and the reference OFDM symbol may be a symbol including the data, the control channel information, and a reference symbol. The data OFDM symbol may be a symbol not including the reference symbol, and the reference OFDM symbol may be a symbol including the reference symbol.

When the DFT precoder 110 performs the DFT with respect to the data symbols included in the reference OFDM symbol, the inserter 220 may insert an M/2 number of "0"s between M/2 data symbols.

In this case, the DFT unit 230 may perform the M-point DFT with respect to the M/2 data symbols between which the M/2 number of "0"s are inserted.

A multiplexer 120 may perform a frequency division multiplexing (FDM) with respect to the discrete Fourier transformed data symbols 121 and reference symbols 122 to generate the reference OFDM symbol. Hereinafter, the FDM with respect to the data symbols 121 and the reference symbols 122 is described with reference to FIG. 3.

Figure 3:
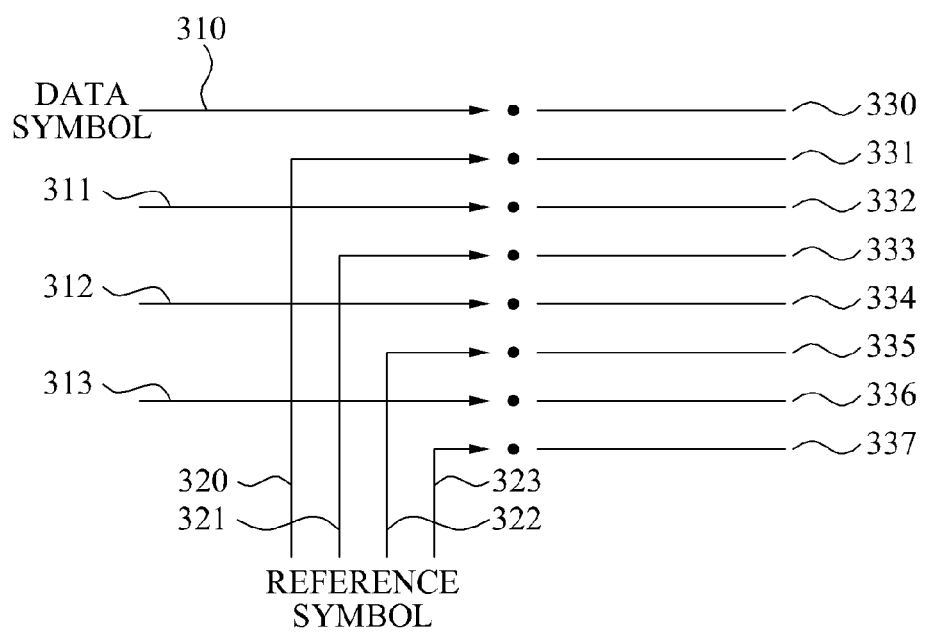
FIG. 3 is a diagram illustrating that a data symbol and a reference symbol are frequency division multiplexed according to an aspect of the present invention.

FIG. 3 is a diagram illustrating that a data symbol and a reference symbol are multiplexed in a frequency domain according to an aspect of the present invention.

Discrete Fourier transformed data symbols 310, 311, 312, and 313 and reference symbols 320, 321, 322, and 323 may be alternately multiplexed. Referring to FIG. 3, the discrete Fourier transformed data symbols 310, 311, 312, and 313 may correspond to odd subcarriers 330, 332, 334, and 336, respectively, and the reference symbols 320, 321, 322, and 323 may correspond to even subcarriers 331, 333, 335, and 337, respectively. As illustrated in FIG. 3, the data symbols 310, 311, 312, and 313 and the reference symbols 320, 321, 322, and 323 may alternately correspond to subcarriers, and this may refer to an interleaved FDM (IFDM).

In FIG. 3, an aspect in which the discrete Fourier transformed data symbols 310, 311, 312, and 313 correspond to odd subcarriers 330, 332, 334, and 336, respectively, and the reference symbols 320, 321, 322, and 323 correspond to even subcarriers 331, 333, 335, and 337, respectively is illustrated, and a case opposite to the above may be applied in another aspect of the present invention. Also, the corresponding relationship between each symbol and the subcarriers may be changed for every OFDM symbol or for every slot.

An aspect in which the data transmission apparatus according to the present invention is applied to a DFT spread OFDM method is described. The data transmission apparatus according to the present invention may be applied to a clustered DFT spread OFDM or an Nx DFT spread OFDM extended based on the DFT spread OFDM.

Figure 4:
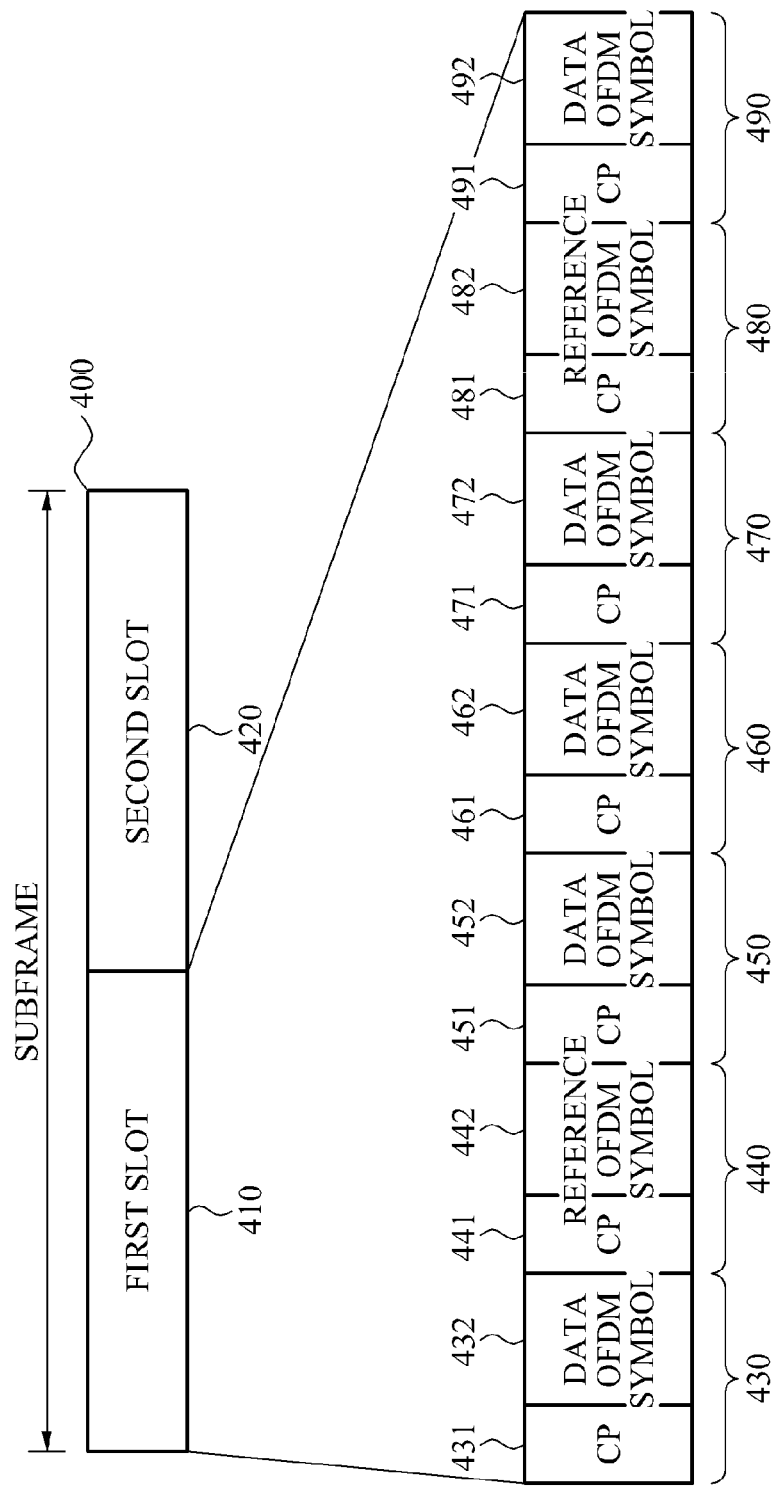
FIG. 4 is a diagram illustrating a subframe structure according to an aspect of the present invention.

An aspect of a subframe structure in which the reference OFDM symbol is configured in the IFDM type proposed by the present invention may be illustrated as FIG. 4.

FIG. 4 is a diagram illustrating a subframe structure according to an aspect of the present invention. A subframe 400 may include a first slot 410 and a second slot 420. The first slot 410 may include a plurality of OFDM symbols 430, 440, 450, 460, 470, 480, and 490.

Each of the OFDM symbols 430, 440, 450, 460, 470, 480, and 490 may include a cyclic prefix (CP) for preventing interference among symbols.

The first slot 410 may include a data OFDM symbol and a reference OFDM symbol. The data OFDM symbol may include a data symbol, and the reference OFDM symbol may include both the data symbol and a reference symbol.

In FIG. 4, the first slot 410 may include two reference OFDM symbols 440 and 480. The data OFDM symbols 430, 450, 460, 470, and 490 may be time division multiplexed with the reference OFDM symbols 440 and 480, and included in the first slot 410.

Since the first slot 410 includes a plurality of reference OFDM symbols 440 and 480, the reference symbols may be transmitted to a data reception apparatus more frequently than the case where a single reference OFDM symbol is included. Since the data reception apparatus receives the reference symbols more frequently, a channel formed between a data transmission apparatus and the data reception apparatus may be estimated accurately.

In FIG. 4, an aspect in which the first slot 410 includes five data OFDM symbols 430, 450, 460, 470, and 490, and includes two reference OFDM symbols 440 and 480 is illustrated. According to another aspect of the present invention, the number and position of the data OFDM symbols, and the number and position of the reference OFDM symbols may be configured variably according to a design of a data transmission system.

The resource element mapper 130 of FIG. 1 may map, to a subcarrier, the frequency division multiplexed data symbols and the reference symbols included in the reference OFDM symbol. This may correspond to mapping the reference OFDM symbol to the subcarrier. The resource element mapper 130 may map the data symbols and the reference symbols to the subcarrier to which each data symbol and each reference symbol correspond.

The IFFT unit 140 of FIG. 1 may perform an IFFT with respect to the reference OFDM symbol mapped to the subcarrier.

The cyclic prefix inserter 150 of FIG. 1 may insert a cyclic prefix symbol into the inverse fast Fourier transformed reference OFDM symbol.

The transmitter 160 of FIG. 1 may transmit the reference OFDM symbol with the inserted cyclic prefix to a data reception apparatus.

In FIG. 1, an aspect in which the data transmission apparatus 100 uses a single transmit antenna is illustrated. However, the present invention may be applied to a case where the data transmission apparatus 100 uses a plurality of transmit antennas.

Figure 5:
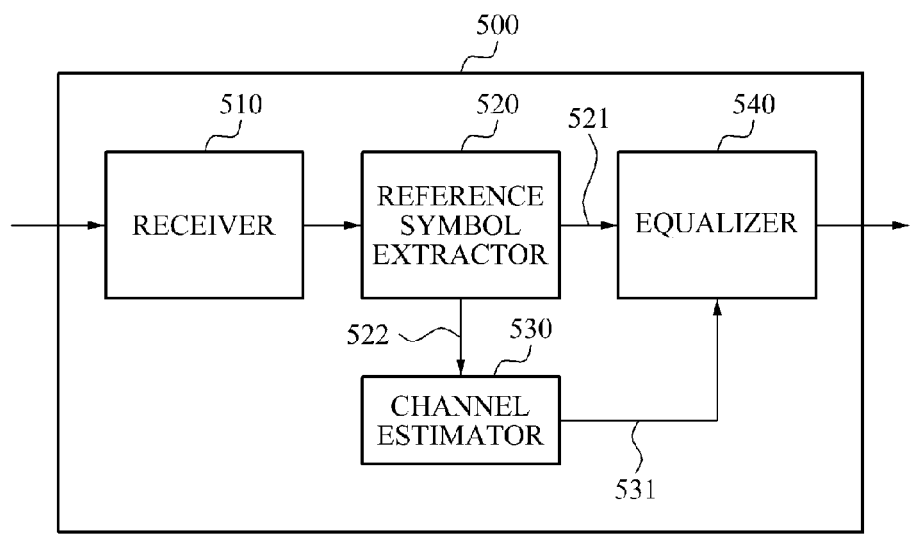
FIG. 5 is a diagram illustrating a structure of a data reception apparatus according to an aspect of the present invention.

FIG. 5 is a diagram illustrating a structure of a data reception apparatus according to an aspect of the present invention. A data reception apparatus 500 may include a receiver 510, a reference symbol extractor 520, a channel estimator 530, and an equalizer 540.

The receiver 510 may receive, from a data transmission apparatus, a reference OFDM symbol in which a data symbol and a reference symbol are frequency division multiplexed.

The reference symbol extractor 520 may extract only the reference symbol from the reference OFDM symbol. In the reference OFDM symbol, the data symbol and the reference symbol may be mapped to respectively different subcarriers. Therefore, the reference symbol extractor 520 may extract the reference symbol included in a subcarrier that is different from a subcarrier in which the data symbol is included.

According to an aspect, the data symbol and the reference symbol may be alternately multiplexed. In this case, the reference symbol extractor 520 may extract the reference symbol by selecting odd or even subcarriers.

The channel estimator 530 may estimate a channel from the data transmission apparatus to the data reception apparatus using the extracted reference symbol 522.

The reference symbol extractor 520 may extract the data symbol from the reference OFDM symbol, and the equalizer 540 may equalize the data symbol 521 using the estimated channel 531.

Hereinafter, an operation of the equalizer 540 is described with reference to FIG. 6.

Figure 6:
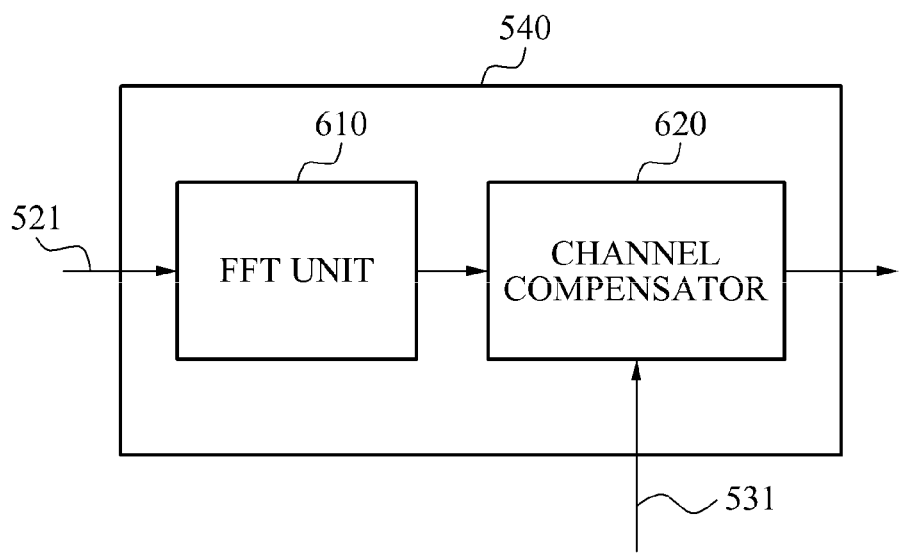
FIG. 6 is a diagram illustrating a structure of an equalizer according to an aspect of the present invention.

FIG. 6 is a diagram illustrating a structure of the equalizer 540 according to an aspect of the present invention. The equalizer 540 may include a fast Fourier transform (FFT) unit 610 and a channel compensator 620.

The FFT unit 610 may perform an FFT operation with respect to the data symbol 521 extracted from a reference OFDM symbol. A phase of the fast Fourier transformed data symbol may be distorted while being transmitted through a channel from a data transmission apparatus to a data reception apparatus.

The channel compensator 620 may compensate for a channel of the fast Fourier transformed data symbol. According to an aspect, the channel compensator 620 may compensate for the channel of the data symbol by using a channel estimated by the channel estimator 530.

In the present invention, operating principles and the effects are described focusing on a DFT spread OFDM system using a single transmit antenna. The present invention is effective in a clustered DFT spread OFDM and an Nx DFT spread OFDM considered to be extended based on the DFT spread OFDM, and effective in a multiple antenna transmission and reception system based on the clustered DFT spread OFDM and the Nx DFT spread OFDM.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A data transmission apparatus, comprising:
    a discrete Fourier transform (DFT) precoder to perform a DFT with respect to N data symbols, wherein the DFT precoder comprises:
        a symbol receiver to receive the N data symbols, wherein N is a integer greater than 3;
        an inserter to insert N zeroes between the data symbols; and
        a DFT unit to perform the DFT with respect to the N data symbols with the inserted N zeroes;
    a multiplexer to generate a reference orthogonal frequency division multiplexing (OFDM) symbol by multiplexing N reference symbols into subcarriers containing the N inserted zeroes and performing a frequency division multiplexing (FDM) with respect to the discrete Fourier transformed N data symbols and the multiplexed N reference symbols, wherein the multiplexer alternately multiplexes the discrete Fourier transformed N data symbols and the N reference symbols;
    an inverse fast Fourier transform (IFFT) unit to perform an IFFT with respect to the reference OFDM symbol; and
    a transmitter to transmit the inverse fast Fourier transformed reference OFDM symbol to a data reception apparatus.

2. The data transmission apparatus of claim 1, wherein the multiplexer performs the FDM with respect to a data OFDM symbol and the reference OFDM symbol, and the data OFDM symbol comprises second data symbols.

3. The data transmission apparatus of claim 1, further comprising:
    a resource element mapper to map the reference OFDM symbol to the subcarriers by mapping the frequency division multiplexed data symbols and the frequency division multiplexed reference symbol to the subcarriers;
    the inverse fast Fourier transform (IFFT) unit to perform the IFFT with respect to the reference OFDM symbol mapped to the subcarriers;
    a cyclic prefix inserter to insert a cyclic prefix symbol into the inverse fast Fourier transformed reference OFDM symbol; and
    the transmitter to transmit the reference OFDM symbol with the inserted cyclic prefix to the data reception apparatus.

4. The data transmission apparatus of claim 1, wherein the data transmission apparatus is applied to a clustered DFT spread OFDM or an Nx DFT spread OFDM extended based on a DFT spread OFDM.

5. A data communication system, comprising:
a data transmission apparatus, comprising:
- a discrete Fourier transform (DFT) precoder to perform a DFT with respect to N data symbols, wherein the DFT precoder comprises:
  - a symbol receiver to receive the N data symbols, wherein N is a integer greater than 3;
  - an inserter to insert N zeroes between the data symbols; and
  - a DFT unit to perform the DFT with respect to the N data symbols with the inserted N zeroes;
- a multiplexer to generate a reference orthogonal frequency division multiplexing (OFDM) symbol by multiplexing N reference symbols into subcarriers containing the N inserted zeroes and performing a frequency division multiplexing (FDM) with respect to the discrete Fourier transformed N data symbols and the multiplexed N reference symbols, wherein the multiplexer alternately multiplexes the discrete Fourier transformed N data symbols and the N reference symbols;
- an inverse fast Fourier transform (IFFT) unit to perform an IFFT with respect to the reference OFDM symbol; and
- a transmitter to transmit the inverse fast Fourier transformed reference OFDM symbol to a data reception apparatus; and the data reception apparatus, comprising:
  - a receiver to receive, from the data transmission apparatus, the transmitted reference OFDM symbol;
  - a reference symbol extractor to extract the reference symbols from the received reference OFDM symbol;
  - a channel estimator to estimate a channel from the data transmission apparatus using the reference symbols; and
  - an equalizer to equalize the data symbols using the estimated channel.

6. The data reception apparatus of claim 5, wherein the equalizer comprises:
- a fast Fourier transform (FFT) unit to perform an FFT operation with respect to the data symbols; and
- a channel compensator to compensate for the channel of the fast Fourier transformed data symbol by using the estimated channel.

7. A data transmission apparatus, comprising:
- a discrete Fourier transform (DFT) precoder to perform a DFT operation with respect to a plurality of first N data symbols, and to perform the DFT operation with respect to a plurality of second N data symbols, wherein the DFT precoder comprises:
  - an inserter to insert N zeroes between the plurality of first N data symbols, wherein N is an integer greater than 3; and
  - a DFT unit to perform the DFT with respect to the first N data symbols with the inserted N zeroes;
- a multiplexer to generate a first reference orthogonal frequency division multiplexing (OFDM) symbol by multiplexing N reference symbols into subcarriers containing the N inserted zeroes and performing an frequency division multiplexing (FDM) with respect to the discrete Fourier transformed first N data symbols and the multiplexed first N reference symbols, and to generate a second reference OFDM symbol by multiplexing N reference symbols into subcarriers containing N inserted zeroes and performing the FDM with respect to the discrete Fourier transformed second N data symbols and the multiplexed N second reference symbols, wherein the multiplexer alternately performs multiplexing with respect to the discrete Fourier transformed first N data symbols and the multiplexed first N reference symbols;
- an inverse fast Fourier transform (IFFT) unit to perform an IFFT to the first reference OFDM symbol and the second reference OFDM symbol, respectively; and
- a transmitter to transmit, in a same slot, the inverse fast Fourier transformed first reference OFDM symbol and the inverse fast Fourier transformed second reference OFDM symbol to a data reception apparatus.

8. The data transmission apparatus of claim 7, wherein the reference symbols are used to estimate a channel formed between the data transmission apparatus and the data reception apparatus.

9. The data transmission apparatus of claim 7, wherein,
- the multiplexer performs the FDM with respect to a data OFDM symbol comprising third data symbols, the first reference OFDM symbol, and the second reference OFDM symbol, and
- the transmitter includes the data OFDM symbol in the slot, and transmits the data OFDM symbol.

10. The data transmission apparatus of claim 7, further comprising:
- a resource element mapper to map the first reference OFDM symbol to subcarriers by respectively mapping the frequency division multiplexed first N data symbols and the frequency division multiplexed first N reference symbols to the subcarriers; and
- the IFFT unit to perform the IFFT with respect to the first reference OFDM symbol mapped to the subcarriers.

11. The data transmission apparatus of claim 10, further comprising:
- a cyclic prefix inserter to insert a cyclic prefix symbol into the inverse fast Fourier transformed first reference OFDM symbol,
- wherein the transmitter transmits the first reference OFDM symbol with the inserted cyclic prefix symbol to the data reception apparatus.

* * * * *